United States Patent [19]

Hongo et al.

[11] Patent Number: 4,709,944
[45] Date of Patent: Dec. 1, 1987

[54] STEERING WHEEL FOR VEHICLES

[75] Inventors: Suzuaki Hongo; Minoru Niwa, both of Ichinomiya; Takahiro Hashiba, Aichi; Mitsuru Harata, Nagoya; Ichiro Hirata, Gifu; Isamu Ito, Inazawa; Akihiko Sonobe, Nagoya, all of Japan

[73] Assignee: Toyoda Gosei Co., Ltd., Nishikasugai, Japan

[21] Appl. No.: 860,795

[22] Filed: May 8, 1986

[30] Foreign Application Priority Data

May 9, 1985 [JP] Japan .................................. 60-98821
May 9, 1985 [JP] Japan .................................. 60-98822
Oct. 29, 1985 [JP] Japan .................................. 60-242230

[51] Int. Cl.⁴ .......................... B62D 1/08; B60R 21/02
[52] U.S. Cl. ..................................... 280/777; 280/750; 74/552
[58] Field of Search ................... 280/777, 750; 74/492, 74/552, 556

[56] References Cited

U.S. PATENT DOCUMENTS 3,948,118 4/1976 Garbin ................................ 280/777
3,992,041 11/1976 Vernocchi ........................... 280/750
4,390,193 6/1983 Strahan et al. ....................... 280/777
4,447,069 5/1984 Winiechi ............................. 280/777

Primary Examiner—Richard A. Bertsch
Attorney, Agent, or Firm—Cushman, Darby & Cushman

[57] ABSTRACT

In a steering wheel for vehicles, a self-aligning plate comprises a boss fitting portion, a spoke fitting portion and a plurality of plastically deformable arm portions arranged in radial direction in an annular space formed between both fitting portions so as to connect between an assembled body of rim/spokes and a boss. Each plastically deformable arm portion of the self-aligning plate has a curved portion at intermediate portion, and when impact force is applied to the rim, the rim surface is slanted in approximately perpendicular direction with respect to the line of impact force due to plastic deformation of the plastically deformable arm portion. Intersection angle between the adjacent plastically deformable arm portions near the spokes mounted on the spoke fitting portion is made obtuse angle, thereby stress concentration at edge portion of the boss fitting portion in the intersection position between these plastically deformable arm portions is prevented.

5 Claims, 15 Drawing Figures

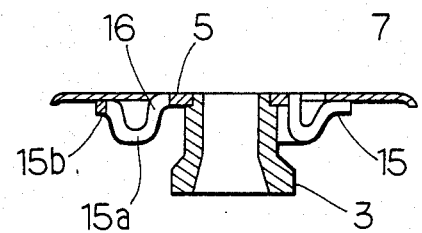
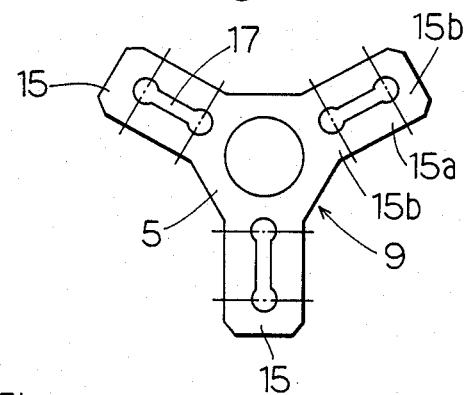
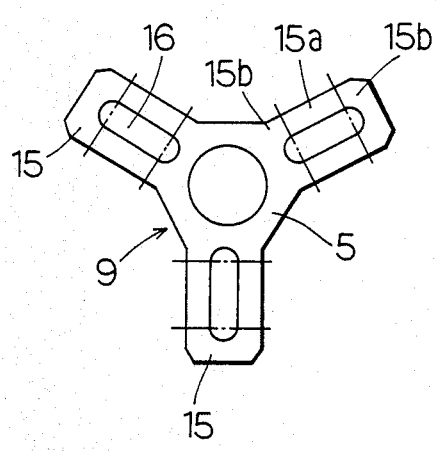
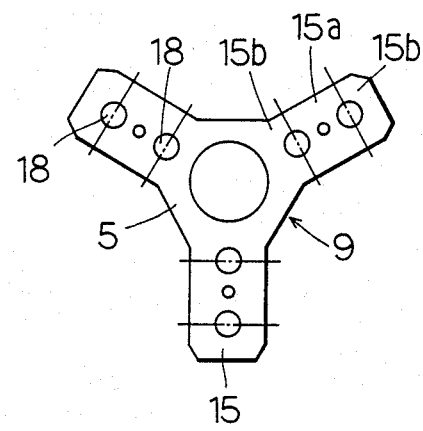

STEERING WHEEL FOR VEHICLES

BACKGROUND OF THE INVENTION

The present invention relates to a steering wheel for vehicles, provided with so-called self-aligning structure, wherein when impact load acts on a rim, the rim surface is slanted in approximately perpendicular direction with respect to the line of action of the impact load. More specifically, the self-aligning structure is constituted in that a self-aligning plate (connector) comprising a boss fitting portion, a spoke fitting portion and a plurality of plastically deformable arm portions arranged in an annular space formed between both fitting portions, is arranged between an assembled body of rim/spokes and a boss. When impact load acts on the rim, the rim surface is slanted in approximately perpendicular direction with respect to the line of action of the impact load due to plastic deformation of the plastically deformable arm portions.

Such a steering wheel in the prior art is disclosed, for example, in Japanese U.M. application laid-open No. 9764/1985 (refer to FIGS. 1~3). In this example, five plastically deformable arm portions 15 each having a curved portion 15a at intermediate portion are arranged in radial direction between an annular boss fitting portion 5 and a spoke fitting portion 7 with respect to three spokes 11, and a self-aligning plate (connector) 9 with the plastically deformable arm portions 15 are arranged between a boss 3 and an assembled body of rim 13/spokes 11.

When load acts on the rim 13 of the steering wheel (FIG. 2), surface of the rim 13 is slanted in approximately perpendicular direction with respect to the line of action (FIG. 3, hereinafter referred to as "self-aligning function").

On the other hand, demand of a steering wheel of two-spoke type is increasing due to request from the view point of design.

In order to apply to the self-aligning plate 9 with the five plastically deformable arm portions 15 of the prior art to the above-mentioned steering wheel of two-spoke type (refer to FIG. 1), since stress concentration is apt to occur particularly at edge portion of the boss fitting portion 5 in the intersection position between the two plastically deformable arm portions 15 near both spokes 11, chamfering or annealing must be applied to the intersection position so as to provide the durability. In other words, if the working accuracy is not increased in the intersection position between the two plastically deformable arm portions 15 near the spokes 11, sufficient durability cannot be maintained. That is, the self-aligning plate 9 is usually manufactured by means of press punching, and, during the manufacturing, accuracy of a press cutting edge or a setting jig must be increased and burr removing finishing after the punching must be performed carefully.

SUMMARY OF THE INVENTION

The invention relates to a steering wheel for vehicles having self-aligning structure. A self-aligning plate comprising a boss fitting portion, a spoke fitting portion and a plurality of plastically deformable arm portions arranged in an annular space formed between both fitting portions, is made a connector between an assembled body of rim/spokes and a boss. Each plastically deformable arm portion has a curved portion at intermediate portion, and intersection angle between the adjacent plastically deformable arm portions near the spokes mounted on the spoke fitting portion is made obtuse angle, thereby stress concentration is not produced at edge portion of the boss fitting portion in the intersection position between these plastically deformable arm portions and special treating work such as annealing need not be applied to the intersection position.

BRIEF DESCRIPTION OF THE DRAWINGS

FIG. 9 is a sectional view taken in line IX—IX of FIG. 8;

FIG. 10A is a plan view of an example of a self-aligning plate (omitting a spoke fitting portion) applied to the first embodiment;

FIG. 10B is a plan view of another example of a self-aligning plate;

FIG. 10C is a plan view of still another example of a self-aligning plate;

DESCRIPTION OF THE PREFERRED EMBODIMENTS

Figure 2:
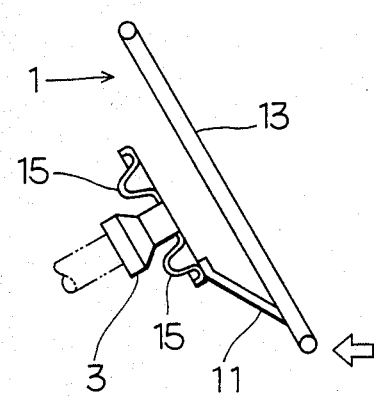
FIG. 2 is a diagram illustrating self-aligning function before load acting.
Figure 3:
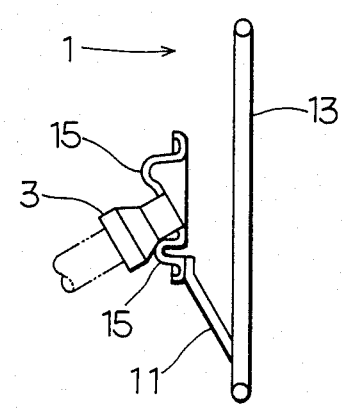
FIG. 3 is a diagram illustrating self-aligning function after load acting.

Embodiments of the invention will now be described referring to the accompanying drawings (FIGS. 4~13). Like parts to those in the prior art are designated by the same reference numerals, and the description shall be omitted. Self-aligning function in the embodiments is similar to that of the prior art as shown in FIGS. 2 and 3.

(1) First Embodiment (FIG. 4~7)

This embodiment discloses a steering wheel 1 of two-spoke type to which a self-aligning plate (connector) 9 with three plastically deformable arm portions 15 are applied.

The steering wheel 1 of the embodiment is constituted as hereinafter described.

A self-aligning plate (connector) 9 comprises a boss fitting portion 5, a spoke fitting portion 7, and three plastically deformable arm portions 15 which are distributed uniformly and radially in an annular space formed between both fitting portions 5, 7. The self-aligning plate (connector) 9 is arranged between a boss 3 and an assembled body of rim 13/spokes 11. Then intersecting angle of the plastically deformable arm portions 15 becomes 120° being obtuse angle, and each spoke 11 is disposed between the plastically deformable arm portions 15, 15. Of course, an edge portion 10 of the boss fitting portion 5 connecting between opposite sides 15a, 15a of the plastically deformable arm portions 15, 15 is made smooth without sharp edge. This is common in respective embodiments as hereinafter described.

Although the plastically deformable arm portions 15 are welded to lower surface of the spoke fitting portion 7 in the embodiment, the arm portions 15 may be welded to upper surface of the spoke fitting portion 7. In this case, since a bend of U-like form projects upward, abutting between a horn pad (not shown) and upper end of the bend must be prevented. On the other hand, when the plastically deformable arm portions 15 are welded to the lower surface of the spoke fitting portion 7, care must be taken for contacting of lower end of the bend of U-like form with a column cover (not shown), and when surface of the rim 13 is slanted, abutting state between the plastically deformable arm portions 15 and the boss 3 must be adjusted (refer to FIG. 3).

In the embodiment, of course, since self-aligning function is effected and intersection angle between the plastically deformable arm portions 15 neighboring with each other near the spoke 11 is made obtuse angle, stress concentration in the position scarcely occurs. Consequently, high working accuracy is not required in the position, and troublesome work such as annealing may be omitted. Also, since the embodiment has the plastically deformable arm portions 15 being three in number (five in the prior art), the process number for the welding to the spoke fitting portion 7 may be reduced.

Each plastically deformable arm portion 15 is usually formed by two steps of bending work or the like into a U-like bend. Smoothing of the bend particularly at side of the boss fitting portion 5 is favorable, because the work hardening scarcely occurs in the position and the connecting state between the boss fitting portion 5 and the plastically deformable arm portion 15 becomes smooth.

Figure 6:
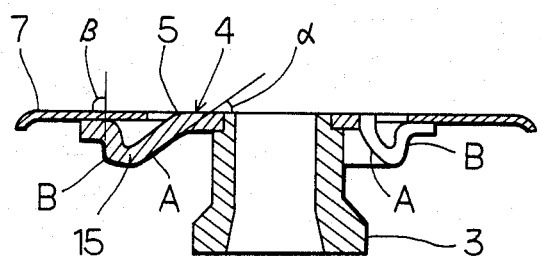
FIG. 6 is a sectional view of another example taken in line V—V of FIG. 4.

As shown in FIG. 6, assume that slanting angle of position A of the curved portion at side of the boss fitting portion (intersection angle to the upper surface of the boss fitting portion 5) α is made as gentle as 20°∼70° (45° in the embodiment), and that slanting angle of position B at side of the spoke fitting portion (intersection angle to the upper surface of the spoke fitting portion 7) β is made as sharp as not less than 75°. This construction may be applied to respective embodiments as hereinafter described.

Figure 5:
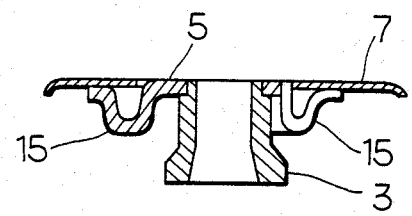
FIG. 5 is a sectional view of an example taken in line V—V of FIG. 4.

In above constitution, of course, the plastically deformable arm portions 15 can be formed by two steps of bending work or press work in similar manner to that of FIG. 5. However, since the bend is gentle on the position A at side of the boss fitting portion, the plastically deformable arm portions 15 can be formed by one step of bending work or press work.

Also, since the bend is smooth on the position A of the plastically deformable arm portion 15 at side of the boss fitting portion, even if the working time in the bending work or the press work is reduced to 1/1.5 in comparison to that of FIG. 5 (rapid bending), the work hardening scarcely occurs on the position at side of the boss fitting portion.

When the working time is reduced as above described, the position B of the plastically deformable arm portion 15 at side of the spoke fitting portion is bent approximately in crank form (about half of the U-like bend shown in FIG. 5) and therefore liable to the work hardening. However, since the self-aligning function of the steering wheel is effected first on the position A of the plastically deformable arm portions 15 and the plastic deformation is transferred from the position A gradually, even if the position B at side of the spoke fitting portion is slightly subjected to the work hardening, the self-aligning function of the steering wheel is not obstructed.

Also in the bending work of two steps, if the position A at side of the boss fitting portion is bent in a short time and further the portion B at side of the spoke fitting portion is bent slowly (or in the reverse sequence), the total working time is reduced in comparison to that of FIG. 5.

Figure 7:
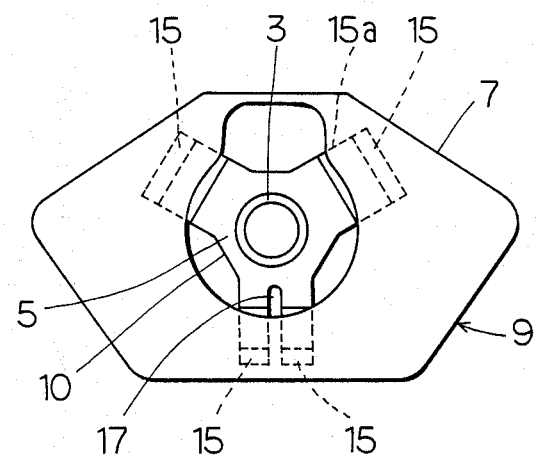
FIG. 7 is a plan view of modification of the first embodiment omitting an assembled body of rim/spokes.

FIG. 7 shows modification of the first embodiment. In FIG. 7, the center of the plastically deformable arm portion 15 at lower side is notched in the longitudinal direction thereby a slit 17 is formed and the connector 9 is provided with the four plastically deformable arm portion 15. The connector 9 in this constitution effects the same function as that shown in FIG. 4.

Figure 8:
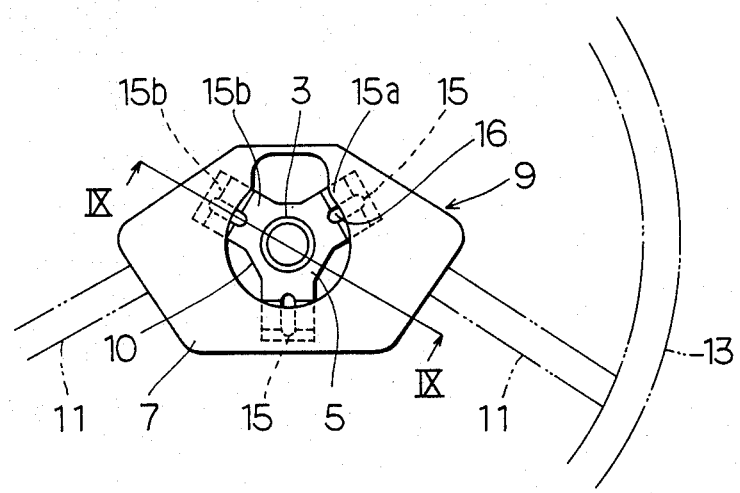
FIG. 8 is a plan view illustrating main part of a second embodiment.

(2) Second Embodiment (FIGS. 8∼10)

Figure 4:
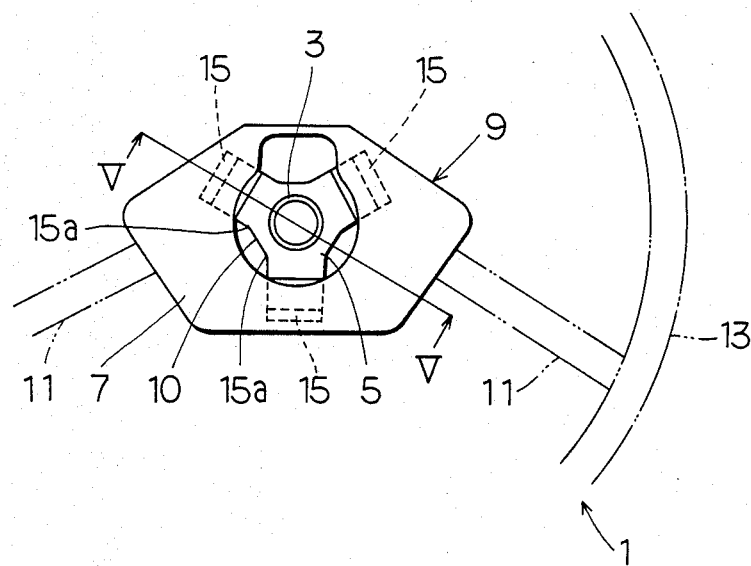
FIG. 4 is a plan view illustrating main part of a first embodiment.

In the steering wheel shown in FIGS. 4∼5, each plastically deformable arm portion 15 of the self-aligning plate 9 is provided with a punched hole 16 of oval form which extends over both ends of the curved portion 15a of the arm portion 15 (FIG. 10A). Both ends of the punched hole encroach on the usual portion 15b. Form of the punched hole is not limited to that shown in FIG. 10A, but a dumbbell form 17 as shown in FIG. 10B or a plurality of circular holes 18 as shown in FIG. 10C or other various modifications may be used on the basis of plastic deformation load values required for the plastically deformable arm portion 15. In the embodiment, dash-and-dot line indicates the positions of both ends of the curved portion 15a. The punched hole 16 is formed usually by punching, fut cutting work may be used.

In a steering wheel for vehicles according to the embodiment, among a plurality of plastically deformable arm portions of the self-aligning plate, one having the plastic deformation load value higher than a prescribed value is provided with a punched hole of suitable size formed over ends of the cruved portion and encroaching on the usual portion, and the punched hole is made a closed form. Thus in addition to the working effect of the first embodiment, the second embodiment has effects in that the plastic deformation load value of the plastically deformable arm portions of the self-aligning plate can be easily adjusted without varying the self-aligning plate in thickness or material, i.e., without deteriorating the welding intensity with the boss or the like.

The punched hole is constituted to encroach on the usual portion, because the sectional form on both ends of the curved portion and adjacent to both ends in the longitudinal direction becomes the most important factor of the plastic deformation value. If the punched hole is not made a closed form, end portion of the punched hole is divided at side of the spoke fitting portion or the boss fitting portion and therefore the prescribed welding intensity cannot be obtained.

Figure 11:
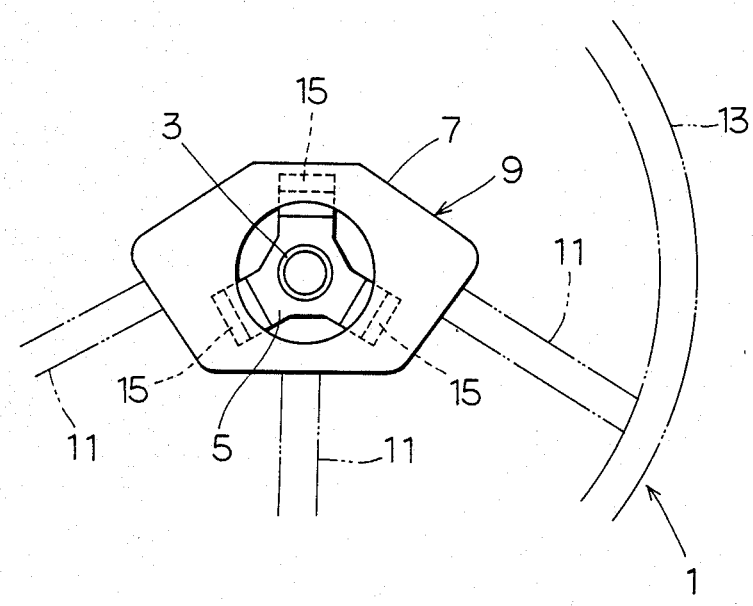
FIG. 11 is a plan view illustrating main part of a third embodiment.

(3) Third Embodiment (FIG. 11)

This embodiment disclosed the steering wheel 1 of three-spoke type to which the self-aligning plate 9 with the three plastically deformable arm portions 15 are applied.

In this embodiment, since connection between each spoke 11 and the spoke fitting portion 7 is interposed between both plastically deformable arm portions 15, the self-aligning plate 9 is arranged on the spoke fitting portion 7 at rotated state by 180° form the first embodiment and angle between both plastically deformable arm portions 15 is made obtuse angle, thus function of the third embodiment is similar to that of the first embodiment.

Also in the third embodiment, of course, a punched hole of suitable size can be formed on a prescribed plastically deformable arm portion in similar manner to the second embodiment from the view point of adjusting the plastic deformation load value.

Figure 12:
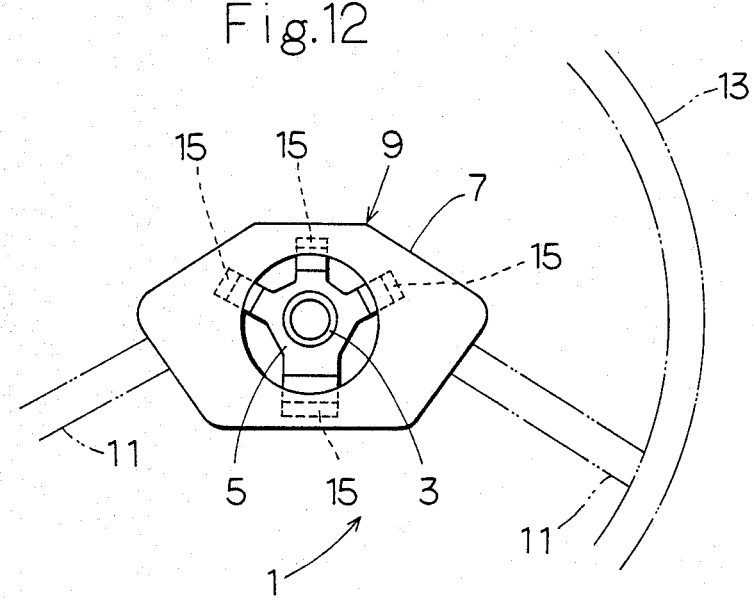
FIG. 12 is a plan view illustrating main part of a fourth embodiment.

(4) Fourth Embodiment (FIG. 12)

This embodiment discloses the steering wheel 1 of two-spoke type to which the self-aligning plate 9 with the four plastically deformable arm portions 15 are applied.

Figure 1:
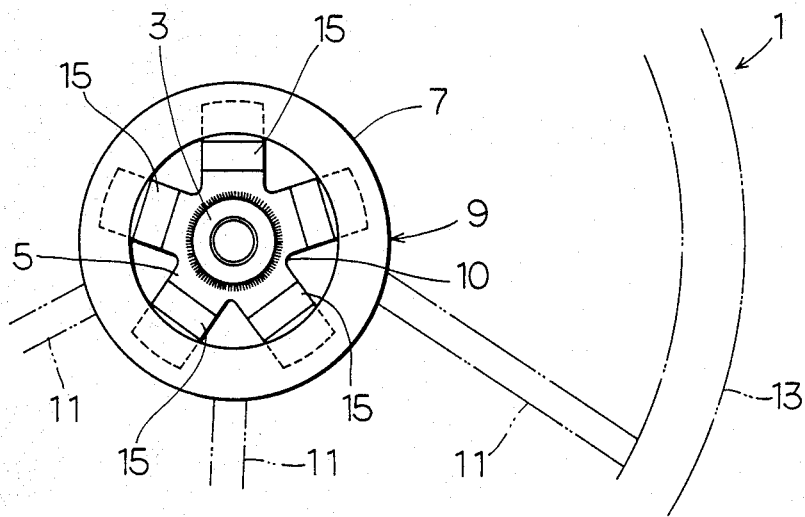
FIG. 1 is a plan view illustrating main part of a steering wheel in the prior art.

In this embodiment, the two plastically deformable arm portions 15 at upper side of the first embodiment as shown in FIG. 1 are equally divided into three. Consequently, troublesome work of welding the plastically deformable arm portions 15 to the spoke fitting portion 7 increases corresponding to increase of one plastically deformable arm portion 15. However, since the intersection angle between the two adjacent plastically deformable arm portions 15 near the welding of the spoke 11 is made obtuse angle, the fourth embodiment effects similar function to that of the first embodiment.

Figure 13:
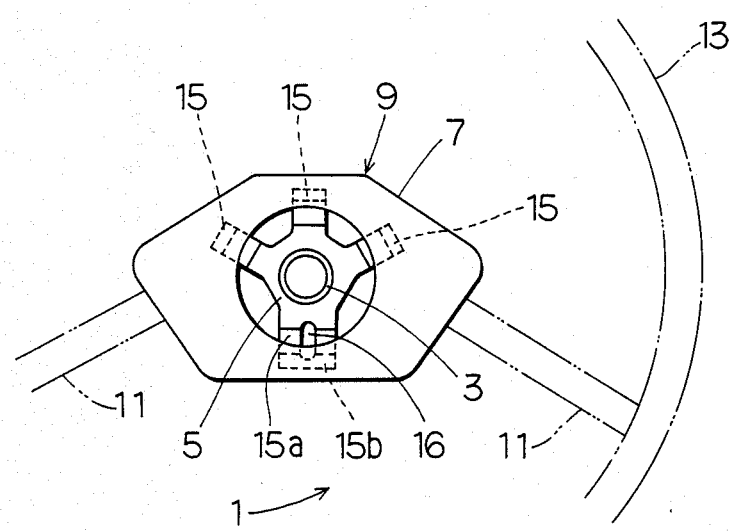
FIG. 13 is a plan view illustrating main part of a fifth embodiment.

(5) Fifth Embodiment (FIG. 13)

Only one plastically deformable arm portion 15 at lower side of the fourth embodiment as above described has the plastic deformation load value higher than the prescribed value. Consequently, in this fifth embodiment, the punched hole 16 is formed throughout the overall length of the curved portion 15b of the plastically deformable arm portion 15 at lower side.

Working effect of the fifth embodiment is similar to that of the second embodiment.

What is claimed is:

1. A steering wheel for vehicles, comprising:
   (a) a rim;
   (b) two spokes each having a radially inner end and radially outer end, the two spoked having respective outer ends thereof secured to said rim thereby providing a spoke assembled body;
   (c) a self-aligning plate connecting between said inner ends of said spokes and a boss, said self-aligning plate comprising a boss-fitting portion, a spoke-fitting portion and three plastically deformable arm portions arranged to extend in respective radial directions as a substantially Y-shaped array in an annular space formed between said boss-fitting portion and said spoke-fitting portion so as to interconnect said boss-fitting portion to said spoke-fitting portion;
   (d) intermediate portions of said plastically deformable arm portions being curved;
   (e) an intersection angle defined between the respective two adjacent said plastically deformable arm portions near the respective spokes mounted on said spoke-fitting portion being obtuse; and
   (f) one of said two spokes being connected to said self-aligning plate between a pair of adjoining ones of said deformable arm portions, and the other of said two spokes being connected to said self-aligning plate between another pair of adjoining ones of said deformable arm portions.

2. A steering wheel as set forth in claim 1, wherein slanting angle of the curved portion of the plastically deformable arm portion at side of the boss fitting portion (intersection angle to the upper surface of the boss fitting portion) is 20°~70°, and slanting angle thereof at side of the spoke fitting portion (intersection angle to the upper surface of the spoke fitting portion) is 70°~90°.

3. A steering wheel for vehicles, comprising:
   (a) a rim;
   (b) a spoke assembled body;
   (c) a self-aligning plate connecting between the assembled body of rim/spokes and a boss, said self-aligning plate comprising a boss fitting portion, a spoke fitting portion and plastically deformable arm portions arranged in radial direction in an annular space formed between both fitting portions;
   (d) curved portions provided on intermediate portion of the plastically deformable arm portions respectively;
   (e) intersection angle between the adjacent plastically deformable arm portions near the spokes mounted on the spoke fitting portion being made obtuse angle; and
   (f) one plastically deformable arm portion having the plastic deformation load value higher than a prescribed value among the plurality of plastically deformable arm portions being provided with a punched hole of suitable size formed at least over both ends of the curved portion and encroaching on the usual portion, and said punched hole being made a closed form.

4. A steering wheel as set forth in claim 3, wherein the spokes are two in number.

5. A steering wheel as set forth in claim 3, wherein slanting angle of the curved portion of the plastically deformable arm portion at side of the boss fitting portion (intersection angle to the upper surface of the boss fitting portion) is 20°~70°, and slanting angle thereof at side of the spoke fitting portion (intersection angle to the upper surface of the spoke fitting portion) is 70°~90°.

* * * * *